Feb. 4, 1969   C. O. BERRYMAN   3,425,712
SAFETY DEVICE
Filed Aug. 23, 1967   Sheet 1 of 2

INVENTOR.
CHARLES O. BERRYMAN
BY
Youett, Raney, Flynn and Tarolli
ATTORNEYS

Feb. 4, 1969   C. O. BERRYMAN   3,425,712
SAFETY DEVICE

Filed Aug. 23, 1967   Sheet 2 of 2

INVENTOR.
CHARLES O. BERRYMAN
BY
*Yount, Roney, Flynn and Tarolli*
ATTORNEYS

United States Patent Office 3,425,712
Patented Feb. 4, 1969

3,425,712
SAFETY DEVICE
Charles O. Berryman, Detroit, Mich., assignor to Eaton Yale & Towne Inc., Cleveland, Ohio, a corporation of Ohio
Filed Aug. 23, 1967, Ser. No. 662,679
U.S. Cl. 280—150                    20 Claims
Int. Cl. B60r 21/02, 21/06

ABSTRACT OF THE DISCLOSURE

A safety device for protecting the occupant of a vehicle during a crash comprises a hollow confinement supported on the vehicle. The confinement is supported in an inoperative or contracted condition and is expanded to an operative or expanded condition by the flow of a fluid into the confinement. The fluid is released to flow to the confinement and expand the confinement upon the vehicle encountering a collision condition. During the collision, the occupant may be thrown against the confinement which acts to cushion or restrain the occupant. The confinement is made of a metal material which deforms beyond its elastic limit to absorb the force or part of the force of impact of the occupant thereagainst. The confinement is deformed as a result of the impact force and remains in its deformed condition to again function as a restraint on further movement of the occupant thereagainst, as would occur in an accident involving multiple collisions.

---

The present invention relates to a safety device for protecting an occupant of a vehicle during a collision, and his movement is cushioned by the confinement. Such to restrain movement of the occupant as a result of a collision.

Heretofore, devices have been suggested for use in vehicles as safety devices which operate to restrain movement of the occupant of the vehicle as a result of a collision. Such devices include a fluid supply which operates to inflate an expansible confinement. During a collision, the occupant of the vehicle engages the confinement and his movement is cushioned by the confinement. Such confinements are made of highly flexible materials having no definite form, such as polyethylene film or fabrics, such as nylon.

Such devices are relatively expensive and are subject to a number of problems. Such devices are readily punctured, thus rendering them completely ineffective. Moreover, in such devices provision must be made to prevent blowing a hole in the confinement upon inflation as well as to prevent substantial impact of the confinement against an occupant of the vehicle on inflation.

Moreover, means are utilized to absorb the energy of the impact of the occupant on the confinement, such as blowout patches and the like, to prevent rebound of the occupant from the confinement. Such means provide for flow of fluid from the confinement in a continuous manner. As the fluid flows from the confinement, the confinement deflates and thus cannot provide a restraint on the occupant of the vehicle after the termination of the fluid flow. Such devices have the further disadvantage that if the vehicle experiences multiple collisions in an accident, the occupant may be thrown against the confinement and then away from the confinement, and then back into the confinement. In such a collision, the confinement may not function to restrain the occupant on his movement as a result of a subsequent collision, since by the time the occupant is moved the second time into the confinement, the confinement could have become deflated.

An important object of the present invention is the provision of a new and improved safety device which obviates the above-noted disadvantages of the fabric or plastic confinements which have been heretofore utilized and which is strong in construction, reliable, relatively inexpensive, and made of a material which substantially retains its form.

Another important object of the present invention is the provision of a new and improved safety device which includes an expansible confinement which operates to restrain multiple movements of the occupant of the vehicle, such as would occur in an accident where the vehicle experiences a series of collisions in which the occupant may be moved repetitievly aganist the confinement.

A still further object of the present invention is the provision of a new and improved safety device for protecting an occupant of a vehicle during a collision and wherein the safety device comprises a hollow confinement which has a contracted condition and is expanded as a result of the vehicle encountering a crash condition, and which includes walls which are deformable and by deforming absorb the energy of the impact of the occupant against the confinement.

A further object of the present invention is the provision of a new and improved safety device for protecting the occupant of a vehicle during a crash and which comprises a hollow confinement which is expanded from a contracted condition by a flow of fluid to the confinement and wherein the expansion of the confinement is effected by the fluid deforming at least a portion of the walls of the confinement and as a result, the kinetic energy of the fluid flowing to the confinement is absorbed due to the deformation of the walls of the confinement.

Another object of the present invention is the provision of a new and improved safety device for protecting an occupant of a vehicle during a collision, and which safety device comprises a hollow confinement supported on the vehicle in a contracted condition and which is expanded to dipsose the confinement adjacent the occupant of the vehicle, and wherein the confinement includes wall means which are made of a metal material which is deformed beyond its elastic limit by the impact of the occupant against the confinement.

Still another object of the present invention is the provision of a new and improved safety device for use in a vehicle and which comprises a confinement which has a contracted condition and which is expanded by the flow of a fluid to the confinement and wherein the confinement is made of a metal material and has exhaust means located therein through which fluid flows due to the fact that the volume of fluid supplied by the source is greater than the volume of the confinement, and wherein the confinement retains its form, even though the fluid flow terminates.

Further objects and advantages of the present invention will be apparent to those skilled in the art to which it relates from the following detailed description of preferred embodiments thereof made with reference to the accompanying drawing in which.

The present invention provides a new and improved safety device for protecting an occupant of a vehicle during a crash. The device is capable of use in automobiles, trucks, airplanes, etc., for the protection of the occupant therein during a collision. In general, the device functions to restrain movement of the occupant during a collision to prevent forceful impact of the occupant against a structural part of the vehicle.

Figure 1:
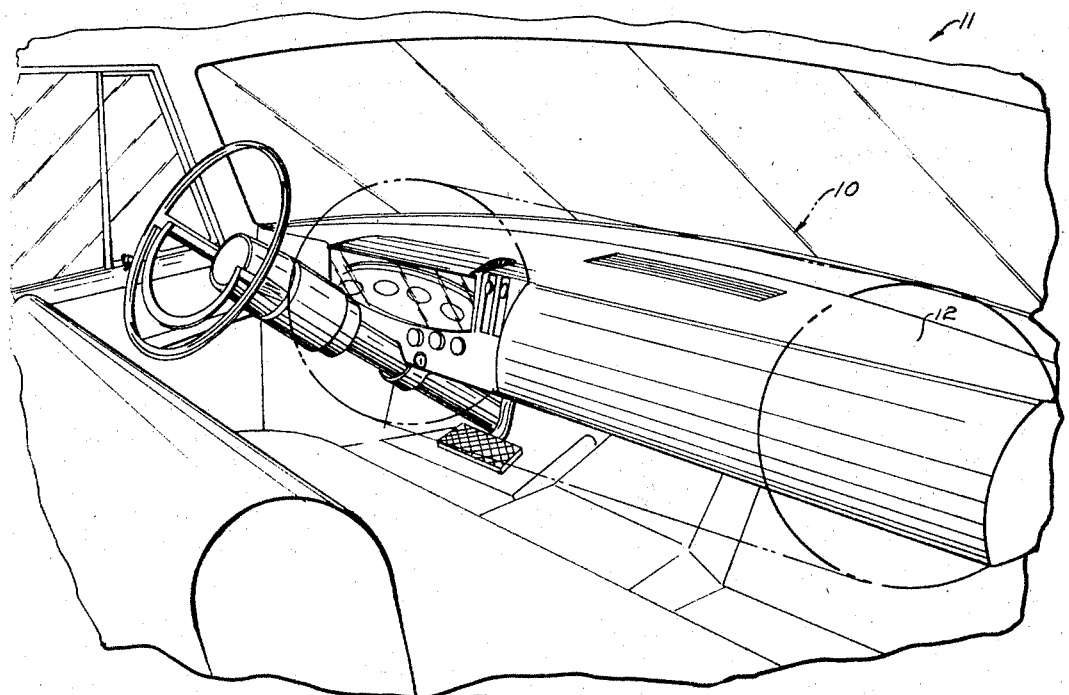
FIG. 1 is a perspective schematic view illustrating an embodiment of the present invention in one manner of application in a vehicle.

As representing the preferred embodiment of the present invention, FIG. 1 of the drawing illustrates a safety device 10 applied to an automotive vehicle 11. The safety device 10 is associated with the dash 12 of the vehicle 11. The safety device 10 includes a confinement 13 having a contracted or inoperative condition, shown in FIG. 2, and an expanded or operative condition, shown on a different scale in FIG. 3.

The confinement 13 comprises wall means 14 which encircles, and defines, a chamber 15. The wall means 14, when contracted, has an accordion-like or bellows portion 16, which may be defined as folded, and a forward portion 17 on which a panel 18 may be mounted. The panel 18 comprises a panel forming a part of the dash and which is styled so as to appear as a portion of the dash when the confinement 13 is in its contracted condition. Moreover, the confinement 13 could be mounted in the back of the front seat of the vehicle 11 or in a door of the vehicle 11 to move toward an occupant of the vehicle 11 and restrain movement of the occupant of the vehicle 11 during a collision. Moreover, the confinement 13 could be mounted without being associated with the panel 18.

Figure 2:
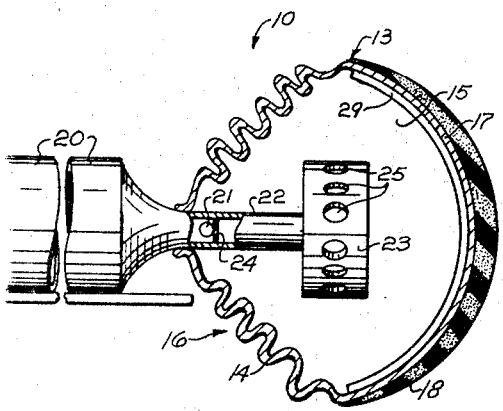
FIG. 2 is a schematic view illustrating the confinement shown in FIG. 1 in its contracted or inoperative condition.
Figure 3:
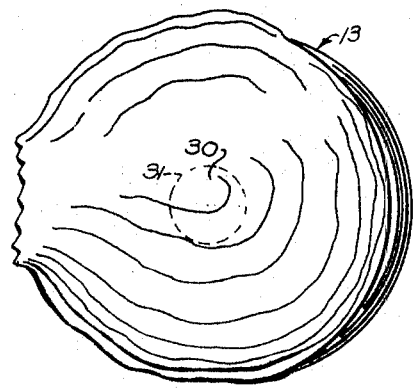
FIG. 3 is a schematic view illustrating the confinement of FIG. 1 in its expanded or operative condition.

The confinement 13 is moved from its contracted condition to its expanded condition, shown in FIG. 3, by the application of fluid pressure in the chamber 15. There is provided suitable means for expanding the confinement from the contracted condition shown in FIG. 2 to the expanded condition shown in FIG. 3. The means for expanding the confinement includes a fluid reservoir or a supply 20. The fluid supply or reservoir 20, when released, provides a stream of fluid which flows to the chamber 15. The fluid is released from the reservoir 20 upon detonation of an explosive 21 which may be located in an outlet conduit 22 leading from the reservoir 20 to a diffuser member 23. The explosive 21 is associated with a diaphragm 24 and, when detonated, breaks the diaphragm 24 and permits the fluid to flow through the conduit 22 to the diffuser 23. The diffuser 23 has a plurality of openings 25 which direct the fluid from the conduit 22 radially thereof and into the chamber 15. The explosive 21 may be detonated in any number of ways, and, for example, may be detonated by a sensor device mounted on the vehicle and which completes a circuit upon a predetermined deceleration of the vehicle 11.

The fluid which flows into the chamber 15 impinges on the interior surface of the confinement 13 and expands the confinement 13 due to the impingement and pressure rise of the fluid thereon. The fluid rushes from the openings 25 and impinges against the confinement 13 at a substantially high velocity. If desired, a sound-absorbing lining 29 may be applied to the interior walls of the confinement 13 to suppress the sound accompanying the inflation of the confinement.

The wall means 14 of the confinement 13 are made of a material which is deformable and substantially non-elastic so that when it is deformed, it will retain the position to which it is deformed. Moreover, the material is self-supporting. Preferably, the confinement 13 is made of sheet steel of approximately 15 mil. thickness. The material of which the confinement is made may vary depending upon forces which it is to encounter.

As the fluid flows into the confinement 13, the accordion portion 16 of the confinement 13 is expanded and deformed by the flow of fluid into the chamber 15, causing an expansion of the confinement 13 to the condition illustrated in FIG. 3, and as shown generally by the dotted lines in FIG. 1. The expansion of the confinement 13 by the flow of the fluid thereinto causes a deformation of the metal of the material beyond the elastic limit of the metal, and the confinement retains the position to which it is expanded by the fluid. The kinetic energy of the fluid rushing into the chamber 15 is absorbed by the deformation of the wall means 14 of the confinement 13, and particularly the bellows portion 16 thereof. As a result, the expansion of the confinement 13 to its condition shown in FIG. 3 is controlled and does not occur in the same manner as in a highly flexible confinement wherein the rush of fluid must be controlled by some sort of diffuser or the like to prevent substantial impact of the confinement against an occupant of the vehicle 11.

The confinement 13 expands so as to be disposed in a position adjacent the occupant of the vehicle. In the modification shown in FIG. 1, the confinement 13 expands toward the occupant located in the front seat of the vehicle. The confinement 13, if mounted in the back of the front seat of the vehicle, would expand toward a passenger in the back seat of the vehicle. Moreover, the confinement 13 could be mounted in association with the steering wheel and steering column of the vehicle so as to move toward the driver of the vehicle when expanded. When the confinement 13 is expanded to a condition such as shown in FIG. 3, the confinement fills a major portion of the area between the occupant of the vehicle and a structural part of the vehicle. Specifically, the confinement 13 is disposed to receive the impact of movement of an occupant of the vehicle during the collision.

Figure 4:
FIGS. 4, 5 and 6 are views illustrating the operation of the confinement in a collision wherein the occupant of the vehicle moves against the confinement multiple times.

The occupant of the vehicle during a collision may be thrown against the expanded confinement 13, as shown in FIG. 4. The impact of the occupant against the confinement 13 may be sufficient to result in deformation of the walls of the confinement 13, as illustrated in FIG. 4. Any deformation of the walls of the confinement 13 due to the impact of the occupant against the confinement 13 cushions the movement of the occupant. The walls, by deforming, absorb the energy of the impact of the occupant, and thus minimize the rebound of the occupant from the confinement 13, as well as protect the occupant from serious injury by impact with solid structural parts of the vehicle, such as the windshield, etc. In addition to the deformation of the material of the confinement 13 absorbing the energy of the impact with the occupant, any fluid in the confinement 13, likewise, will absorb the energy of impact of the occupant against the confinement 13 and assist in restraining the occupant.

Figure 5:
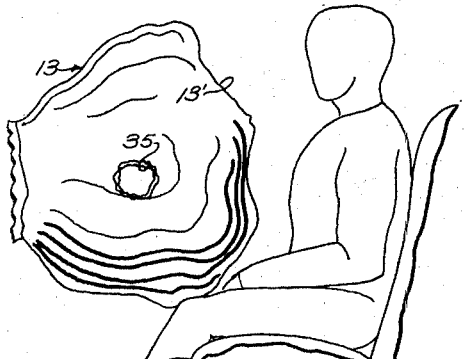

The confinement being made of a rigid material which retains its form remains in a substantially expanded condition, such as shown in FIG. 5, upon termination of a force causing deformation of the confinement 13. Thus, if an occupant rebounds from the confinement 13 or is thrown therefrom, the confinement 13 will remain in the condition to which it was deformed. This is illustrated in FIG. 5 where the occupant is shown thrown from the confinement 13 and the confinement 13 remains expanded but deformed, as indicated by the line 13', as a result of the initial impact of the occupant. This is the case, even if the fluid flow into the confinement ceases.

Figure 6:
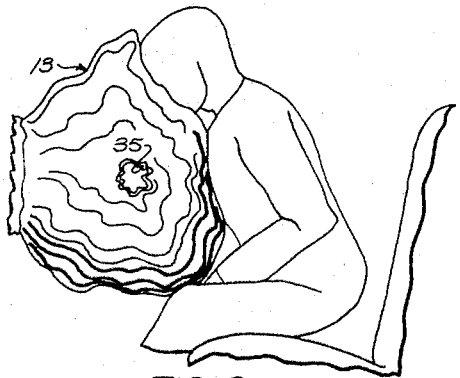

The occupant of the vehicle may rebound from the confinement 13 when the vehicle is involved in an accident where there is a multitude of collisions, as may occur when the vehicle strikes another car and rebounds from that car and hits a pole. On the first collision, the occupant would be thrown forward against the confinement 13, and may then be thrown away from the confinement 13. On the second collision, the occupant may be again thrown forward; however, the confinement 13 would still be in position to cushion the second forward movement of the occupant, as shown in FIG. 6, even though fluid flow may have terminated, and pressure in the chamber 15 is atmospheric. Thus, the confinement 13 of the present invention is especially suitable for protecting the occupant of a vehicle where the vehicle collides with a number of objects.

The confinement 13 of the present invention is provided with a suitable relief means for minimizing pressure buildup in the confinement and which minimizes rebound of the occupant from the confinement. The relief means may take many different forms. For example, it may comprise a perforated disk which is formed over an opening in the confinement; it may comprise a blowout disk which blows out and communicates the chamber 15 with the atmosphere upon a pressure slightly in excess of atmospheric pressure being developed therein; or it may comprise a weakened area of the walls of the confinement which releases upon a predetermined pressure increase in the chamber 15.

As shown in the drawings, the relief means comprises an area of the walls of the confinement designated 30. The area 30 is defined by a suitable score line 31 formed in the confinement 13 which weakens the wall of the confinement 13. The flow of fluid from the supply reservoir 20 into the chamber 15 results in a slight pressure increase on the area 30 which blows out of the wall to provide a hole or opening 35 in the confinement, as shown in FIG. 4. Alternatively, the opening 35 may be achieved as a result of an increase in pressure in the confinement 13 when the occupant strikes or impacts against the confinement 13. The relief means provides a release for excess pressure in the confinement and results in minimizing the rebound of the occupant from the confinement.

The volume of fluid supplied by the reservoir 20 is substantially in excess of the volume of fluid required to expand the confinement 13 and fill the chamber 15. Thus, a continuous flow of fluid is provided through the opening 35 while the occupant moves against the confinement, during the initial collision of the vehicle with an obstruction. This continuous flow of fluid also impinges against the walls of the confinement, and continuously flows through the opening 35 provided by the area 30 as long as a pressure differential exists between the chamber 15 and the atmosphere.

Moreover, as has been described hereinabove, the confinement 13 will remain in a deformed condition, even though the flow of fluid to the confinement 13 terminates. This is quite a distinction from fabric confinements wherein the confinement is not made of a form retaining material but rather deflates when the fluid pressure in the confinement decreases. This aspect of the present confinement makes it particularly suitable for use in vehicles to better ensure occupant safety in an accident where the occupant may be thrown a number of times against the confinement.

Furthermore, the fact that the confinement is made of a metal material which is substantially stronger than a fabric material, the possibility of an opening or hole being formed in the confinement by a sharp object or the like which would render the confinement ineffective and inoperable during an accident, is minimized. Thus, the fact that the confinement is made of metal material rather than a fabric material does render the confinement more reliable.

Figure 7:
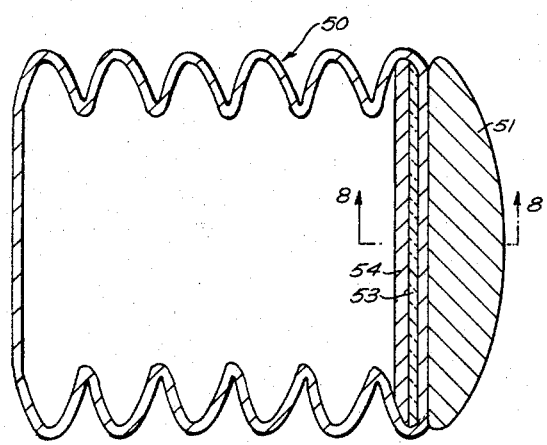
FIG. 7 is a schematic sectional view illustrating a modified construction of a confinement embodying the present invention.
Figure 8:
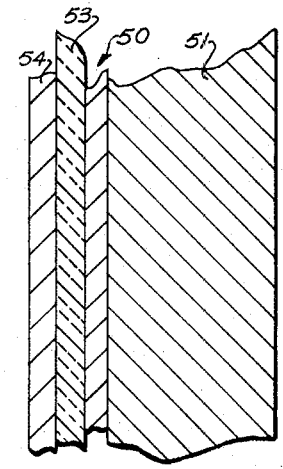
FIG. 8 is an enlarged fragmentary sectional view of a portion of the structure shown in FIG. 7.

A modification of the present invention is shown in FIG. 7 wherein rather than the use of a supply of fluid, such as the supply 20 shown in FIG. 2, a gas generating material is applied to a portion of the wall of the confinement 50. As shown in FIG. 7, the confinement 50 includes metal walls on which a pad 51 forming a portion of the interior of the vehicle is mounted. The interior wall of the confinement is provided with a thermal protective lining 53, such as asbestos or the like, and a gas generating material 54 is applied to the asbestos. The gas generating material 54, when ignited, generates a gas which expands the confinement 50, as described above in connection with FIGS. 1-6. The gas generating material is ignited in response to the vehicle encountering a collision. The thermal insulation material protects the confinement as well as the panel 51 from excessive heat during ignition of the gas generating material. Alternatively, a gas generating capsule may be located in the confinement to provide the gas supply.

From the above, it should be apparent that applicant has provided a new and improved safety device which is quite useful in a vehicle to protect the occupant of the vehicle during a collision, and it should be apparent that certain modifications, changes, and additions may be made therein, and it is intended to cover all such modifications, changes, and additions which come within the scope of the appended claims.

Having described my invention, I claim:

1. A safety device for protecting an occupant of a vehicle during a collision comprising, a confinement carried by the vehicle in a contracted condition, means for expanding said confinement to dispose said confinement adjacent an occupant of the vehicle to provide a restraint for restraining movement of the occupant during the collision, said confinement comprising deformable self-supporting means for absorbing a substantial part of the energy of the impact of the occupant thereagainst due to deformation thereof.

2. A safety device as defined in claim 1 wherein said deformable self-supporting means is made of at least in part a metal material.

3. A safety device as defined in claim 2 wherein said means for expanding said confinement comprises a source of fluid and means for directing a flow of said fluid to said confinement.

4. A safety device as defined in claim 3 wherein said deformable self-supporting means has at least a folded portion which is deformed by said flow of fluid and at least in part absorbs the kinetic energy of said flow.

5. A safety device as defined in claim 3 wherein said supply of fluid is substantially greater than the volume of said confinement and provides a continuous flow of fluid for a time interval, and said confinement retains its condition upon termination of said flow.

6. A safety device as defined in claim 5 wherein said confinement includes relief means providing for continuous flow of fluid from the confinement to the atmosphere as long as a differential in pressure exists therebetween.

7. A safety device for protecting an occupant of a vehicle during a crash comprising a contracted confinement carried by the vehicle, means for expanding said confinement to dispose said confinement adjacent an occupant of the vehicle to provide a restraint for restraining movement of the occupant during the crash, said means including a fluid supply and means for directing fluid to expand said confinement, said confinement comprising deformable means for absorbing at least a portion of the kinetic energy of the fluid flow into the confinement due to deformation of said deformable means.

8. A safety device as defined in claim 7 wherein said means is made at least in part of a non-elastic form retaining metal material.

9. A safety device for protecting an occupant of a vehicle during a collision comprising a contracted confinement carried by the vehicle, means for expanding said confinement to dispose said confinement adjacent an occupant of the vehicle to provide a restraint for restraining movement of the occupant during the collision, said confinement comprising deformable means having a portion receiving the impact of the occupant during the collision, and said deformable means being disposed in an expanded but deformed condition as a result of an impact of the occupant thereagainst with a predetermined force and remaining in said expanded but deformed condition upon termination of said force so as to function as a restraint on a further forward movement of the occupant.

10. A safety device as defined in claim 9 wherein said deformable means is made at least in part of a non-elastic, form retaining metal material.

11. A safety device as defined in claim 10 wherein said means for expanding said confinement comprises a source of fluid and means for directing a flow of said fluid to expand said confinement.

12. A safety device for protecting an occupant of a vehicle during a collision comprising a confinement having a contracted condition, said confinement comprising wall means defining a chamber, means for expanding said confinement, and said wall means including a generally folded portion when said confinement is in its contracted condition, and at least said folded portion being made of a deformable form retaining metal material.

13. A safety device as defined in claim 12 wherein said means for expanding said confinement comprises a source of fluid and means for directing a flow of said fluid to expand said confinement.

14. A safety device as defined in claim 13 wherein said supply of fluid is substantially greater than the volume of the chamber of said confinement and provides a continuous flow of fluid for a time interval, and said confinement retains its condition upon termination of said flow.

15. A safety device as defined in claim 14 wherein said confinement includes relief means providing for continuous flow of fluid from the confinement to the atmosphere as long as a differential in pressure exists therebetween.

16. A safety device as defined in claim 12 wherein said wall means is entirely made of said material.

17. A safety device as defined in claim 1 wherein said means for expanding said confinement comprises a gas generating material.

18. A safety device as defined in claim 17 wherein said gas generating material is located in said confinement and is supported by a thermal protective lining on the interior thereof.

19. A safety device as defined in claim 12 wherein said confinement has a sound-absorbing lining therein.

20. A safety device as defined in claim 12 wherein said means for expanding said confinement comprises a fluid reservoir, a fluid conduit communicating with said reservoir, a diaphragm member located in said conduit and blocking fluid flow therethrough, an explosive means associated with said diaphragm and when ignited releasing said diaphragm to provide for fluid flow through said conduit, and a diffuser member associated with said conduit and operable to direct the fluid into said confinement.

References Cited

UNITED STATES PATENTS

| | | | |
|---|---|---|---|
| 2,850,291 | 9/1958 | Ziccardi | 280—150 |
| 3,197,234 | 7/1967 | Bertrand | 280—150 |
| 3,336,045 | 8/1967 | Kobori | 280—150 |

BENJAMIN HERSH, *Primary Examiner.*

JOEL E. SIEGEL, *Assistant Examiner.*